US008727666B2

(12) United States Patent
Farley et al.

(10) Patent No.: US 8,727,666 B2
(45) Date of Patent: May 20, 2014

(54) PIPELINE INSERTION SYSTEM

(75) Inventors: E. Ray Farley, Wooster, OH (US);
Benjamin Back, Orville, OH (US)

(73) Assignee: Brasfond USA Corp., Wooster, OH (US)

( * ) Notice: Subject to any disclaimer, the term of this patent is extended or adjusted under 35 U.S.C. 154(b) by 115 days.

(21) Appl. No.: 13/508,613

(22) PCT Filed: May 27, 2011

(86) PCT No.: PCT/US2011/038356
§ 371 (c)(1),
(2), (4) Date: May 8, 2012

(87) PCT Pub. No.: WO2011/150341
PCT Pub. Date: Dec. 1, 2011

(65) Prior Publication Data
US 2012/0230771 A1 Sep. 13, 2012

Related U.S. Application Data

(60) Provisional application No. 61/349,759, filed on May 28, 2010.

(51) Int. Cl.
*F16L 1/028* (2006.01)
(52) U.S. Cl.
USPC .............................. 405/184; 405/169; 405/170
(58) Field of Classification Search
USPC ......... 405/169, 170, 174, 177, 184; 254/29 R
See application file for complete search history.

(56) References Cited

U.S. PATENT DOCUMENTS

| 3,711,064 | A | 1/1973 | Kielczewski |
| 3,745,319 | A | 7/1973 | Unigovsky et al. |
| 4,091,629 | A | 5/1978 | Gunn et al. |
| 4,300,276 | A | 11/1981 | Davis |
| 4,329,087 | A | 5/1982 | Satterwhite |
| 4,379,676 | A | 4/1983 | Frias |
| 4,502,665 | A | 3/1985 | Yoder |
| 4,605,151 | A | 8/1986 | Brown |
| 4,955,757 | A | 9/1990 | Balling |
| 5,205,671 | A | 4/1993 | Handford |
| 5,209,605 | A | 5/1993 | Cherrington |
| 5,303,783 | A | 4/1994 | Begnaud et al. |
| 5,316,092 | A | 5/1994 | Ilomaki |
| 5,375,945 | A | 12/1994 | Cherrington |

(Continued)

FOREIGN PATENT DOCUMENTS

WO 2007108673 A1 9/2007
WO 2008007945 A1 1/2008

*Primary Examiner* — Benjamin Fiorello
(74) *Attorney, Agent, or Firm* — Christopher L. Parmelee; Walker & Jocke

(57) ABSTRACT

A pipeline insertion system (100) may include an insertion device (102) outside a tunnel that includes an insertion device frame (104) and a movable clamp device (106) in slidable engagement with the insertion device frame. A drive may cause the movable clamp device engaged with a pipeline to move between a first position (108) and a second position (110) along the frame. Inside the tunnel, the system may also include a plurality of support frames (118) remote from the insertion device and remote from each other which support the pipeline on bearings as the pipeline is pushed (or pulled) by the insertion device through the bores of a plurality of housing segments (122) mounted in the tunnel. A controller (126) is operative to control the drive and the movable clamp device responsive to transducers which measure pipeline slippage, thrust force, and clamping pressure.

21 Claims, 10 Drawing Sheets

(56) References Cited

U.S. PATENT DOCUMENTS

| | | |
|---|---|---|
| 5,456,325 A | 10/1995 | Pantermuehl et al. |
| 5,482,404 A | 1/1996 | Tenbusch, II |
| 5,505,558 A | 4/1996 | Brown |
| 5,662,432 A | 9/1997 | Colter |
| 5,803,189 A | 9/1998 | Geldner |
| 6,039,508 A | 3/2000 | White |
| 6,073,704 A | 6/2000 | Yasuoka et al. |
| 6,098,708 A | 8/2000 | Jenne |
| 6,109,831 A | 8/2000 | Handford |
| 6,206,345 B1 | 3/2001 | Lenahan et al. |
| 6,364,011 B1 | 4/2002 | Bergeron |
| 6,481,510 B1 | 11/2002 | Desmarais et al. |
| 6,481,930 B2 | 11/2002 | Forrest |
| 6,540,443 B2 | 4/2003 | Kato et al. |
| 6,543,966 B2 | 4/2003 | White |
| 6,582,158 B1 | 6/2003 | Van Stein |
| 6,591,921 B2 | 7/2003 | Jenne |
| 6,641,331 B2 | 11/2003 | Van Bijsterveld |
| 6,736,219 B1 | 5/2004 | White |
| 6,814,167 B2 | 11/2004 | Weixler |
| 6,868,913 B2 | 3/2005 | Vidrine et al. |
| 6,880,453 B2 | 4/2005 | Weixler |
| 7,134,513 B1 | 11/2006 | Randall et al. |
| 7,140,445 B2 | 11/2006 | Shahin et al. |
| 7,261,493 B2 | 8/2007 | Wilkinson |
| 7,284,624 B2 | 10/2007 | Tjader |
| 7,469,754 B2 | 12/2008 | Landry |
| 8,162,201 B2 | 4/2012 | Gomes Fernandes |
| 2005/0232705 A1 | 10/2005 | Scainl |
| 2006/0110219 A1 | 5/2006 | Puttmann |
| 2006/0162750 A1 | 7/2006 | Wilbert |
| 2012/0112015 A1 | 5/2012 | Gomes Fernandes |

PIPELINE INSERTION SYSTEM

BACKGROUND

Pipelines for moving natural gas, oil, and other gases and fluids may be mounted inside tunnels, through wetlands, across shorelines, and other environments with limited accessibility to construct the pipeline. Depending on the location, such pipelines may need to extend for many kilometers through such environments. For instance, pipelines in a tunnel beneath a large city may have lengths of eight or more kilometers.

To construct such a pipeline within a tunnel, the tunnel may be bored with a tunnel boring machine (TBM). Once the tunnel is bored (or as the tunnel is being bored) one or more pipelines may be installed in the tunnel. Pipelines installed in such tunnels are typically constructed out of many pipeline segments that are welded together to form a generally straight run of the pipeline.

Unfortunately, the environmental conditions within the tunnel often impede the productivity of welders and other construction crews installing the pipeline. Environmental conditions associated with wetlands and shoreline approaches also impede the productivity associated with the installation of a pipeline. Thus there is a need for improvement to existing systems for installing pipelines.

SUMMARY

The following is a brief summary of subject matter that is described in greater detail herein. This summary is not intended to be limiting as to the scope of the claims.

Described herein are various technologies relating to installing pipelines. An example system may correspond to a pipeline insertion system. Such a system may include an insertion device that includes a frame, a movable clamp device in slidable engagement with the frame, and at least one drive. The system may also include at least one controller comprising one or more computers, processors, and/or other electrical components that are operatively configured to operate the insertion device to move a pipeline and to monitor the operation of the system.

The at least one controller is operatively configured to cause the at least one drive to move the movable clamp device between a first position and a second position along the frame. Also, the at least one controller is operatively configured to cause the movable clamp device to change between a first state and a second state. In the first state, the movable clamp device is operative to clamp (i.e., rigidly engage and grip) at least one portion of a pipeline received by the pipe insertion device and prevent relative movement between the movable clamp device and the pipeline. In the second state, the movable clamp device is operative to release the at least one portion of the pipeline and permit relative movement between the movable clamp device and the pipeline.

This described system may also include a plurality of housing segments. Each housing segment may be comprised of concrete or other material and may include at least one bore therethrough for receiving portions of the pipeline. Also the system may include a plurality of support frames. Each support frame includes a channel therethrough with at least one bearing mounted therein for receiving portions of the pipeline in operatively sliding connection with the at least one bearing.

In this described embodiment, the support frames are respectively positioned between the ends of the bores of adjacent housing segments, such that the bores of the housing segments and the channels of the support frames are aligned to receive the pipeline extending in a substantially straight line through a sequence of many pairs of adjacent housing segments and support frames.

During operation of the system, the at least one controller is operatively configured to cause the movable clamp device to change to the first state to clamp at least one portion of the pipeline and to cause the at least one drive to move the movable clamp device from the first position to the second position in order to move portions of the pipeline within at least one bore of at least one of the housing segments and at least one channel of at least one of the support frames. Also, the at least one controller is operatively configured to cause the movable clamp device to change to the second state and to cause the at least one drive to move the movable clamp device in a reverse direction from the second position to the first position without moving the pipeline relative to the housing segments and support frames.

In this described embodiment, the at least one controller is operatively configured to operate the insertion device for many insertion cycles to incrementally push the pipeline through the bores of many housing segments. Such housing segments may have lengths to accommodate the placement of a sufficient number of support frames between ends of adjacent housing segments in order to support moving a pipeline for a distance of several kilometers through the bores of the housing segments without the pipeline buckling and with no (or at least minimal) contact between the outer surfaces of the pipeline and the inner surfaces of the bores of the housing segments.

When installing a new pipeline, after one or more insertions of portions of the pipeline (via the movable clamp device moving one or more times from the first position to the second position), one or more additional pipeline segments may be welded to the portion (i.e., outer end) of the pipeline that extends outside the housing segments. Once the pipeline has been lengthened in this manner, the insertion device may be operated again to move the movable clamp device one or more times in order to insert more of the pipeline into the bores of the housing segments. This process may be repeated for as many insertion cycles as needed to insert the required length of pipeline in the tunnel.

Also, it should be appreciated that in the described embodiment, the at least one controller may be operatively configured to operate the insertion device to remove a pipeline out of the housing segments. This may be carried out via the movable clamp device moving one or more times from the second position to the first position to pull the pipeline outwardly from the bores of the housing segments. One or more segments of the removed pipeline may be cut off of the pipeline. Once the pipeline has been shortened in this manner, the insertion device may be operated again to move the movable clamp device one or more times in order to pull additional portions of the pipeline out of the bores of the housing segments. This process may be repeated for as many extraction cycles as needed to remove and disassemble the pipeline.

Other aspects will be appreciated upon reading and understanding the attached figures and description.

DETAILED DESCRIPTION

Figure 1:
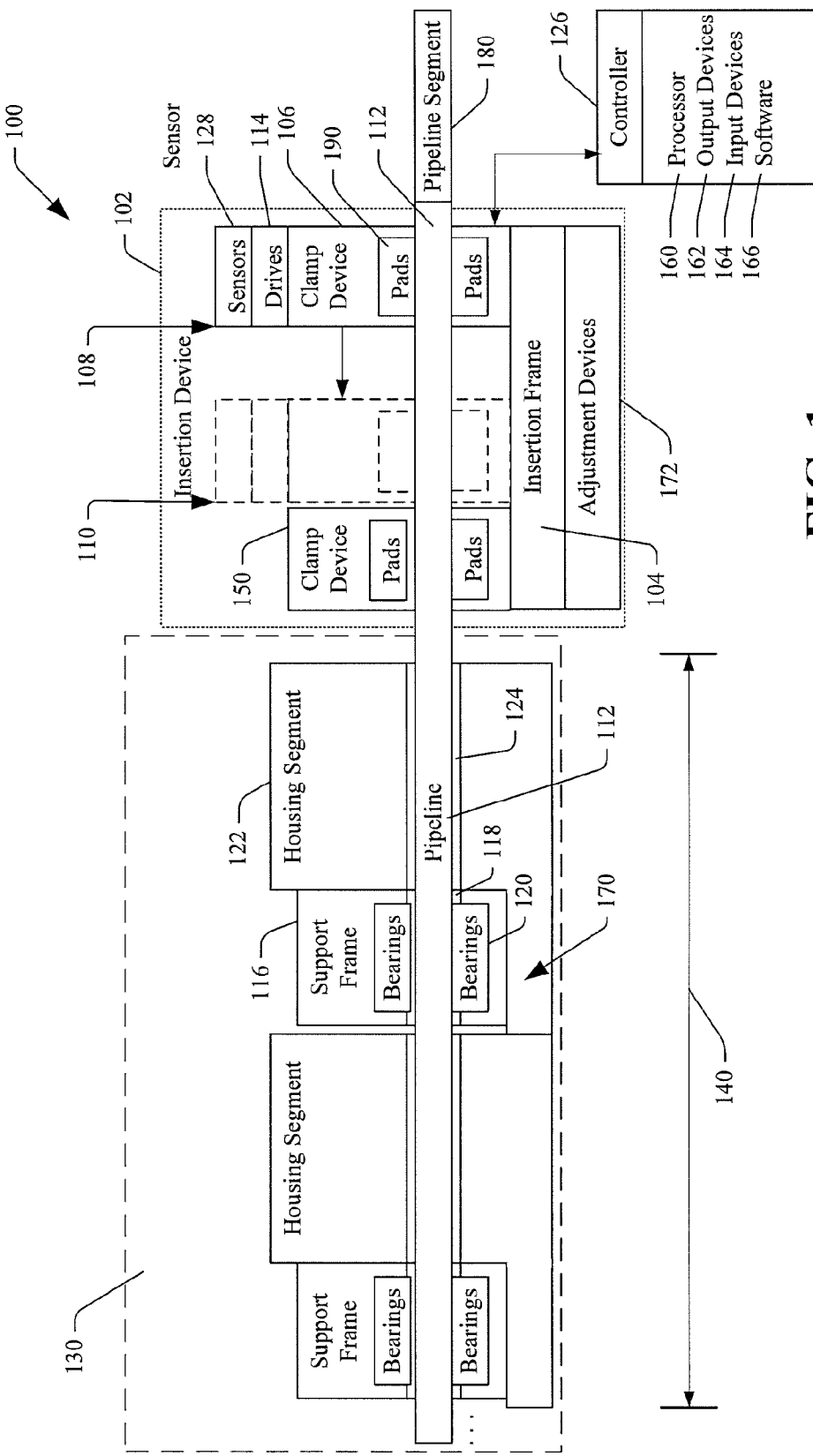
FIG. 1 is a schematic diagram of an example pipeline insertion system.

Various technologies pertaining to pipeline installations will now be described with reference to the drawings, where like reference numerals represent like elements throughout. In addition, several functional block diagrams of example systems are illustrated and described herein for purposes of explanation; however, it is to be understood that functionality that is described as being carried out by certain system components and devices may be performed by multiple components and devices. Similarly, for instance, a component/device may be configured to perform functionality that is described as being carried out by multiple components/devices.

With reference to FIG. 1, an example pipeline insertion system 100 that facilitates moving a pipeline over several kilometers is illustrated. In an example embodiment, the system 100 includes an insertion device 102. As explained in more detail below, this described insertion device is operative to move a pipeline in a generally straight line into and out of a tunnel or other location (e.g., wetlands, shoreline). Such a pipeline may correspond for example to pipeline with a 30 inch outer diameter, 0.500 inch wall thickness API-5L-X70 steel pipe. However, it is to be understood that in alternative embodiments, other sizes of pipelines may be used.

The example system may include at least one controller 126 that is operative to control one or more features of the insertion device. Such a controller may correspond to one or more processors and associated electrical components that are operatively configured to cause features of the insertion device to operate. For example, the system may include a controller in the form of a computer with at least one processor 160 therein. The computer may include software 166 which is operatively configured to control hardware in the insertion device (e.g., motors, pumps, valves, etc.). In another example, the controller may include a processor such as a programmable logic controller with firmware configured to operate the hardware in the insertion device.

In example embodiments, the controller may also be operative to receive signals from sensors 128 (e.g., transducers) mounted to the hardware components of the insertion device. As explained in more detail below, the controller may be responsive to such sensor signals to control how the hardware in the insertion device operates. The controller may also be operative to communicate information regarding the operation of the hardware and the signals from the sensors to one or more local and/or remote output devices 162 (e.g., display screen, visible/audible alarms), to enable users to monitor the insertion device. Furthermore, the controller may be in operative connection with one or more input devices 164 (e.g., touch screen, keyboard, mouse) through which a user may provide inputs that control how the controller operates the insertion device.

In an example embodiment, the insertion device 102 includes a frame 104. Mounted in slidable engagement with the frame is a movable clamp device 106. The at least one controller is operatively configured (e.g., programmed) to cause the movable clamp device to change between a first state in which the movable clamp device clamps a portion of the pipeline in rigid engagement therewith, and a second state in which the movable clamp devices releases the portion of the pipeline from rigid engagement with the movable clamp device.

When the movable clamp device is in the first state, the applied clamping forces are operative to prevent movement of the pipeline relative to the movable clamp device. Also, it should be understood that the controller may be operative to vary the amount of clamping forces applied by the clamp device depending on the diameter, weight, and current length of the pipeline, and the amount of force needed to move the pipeline. Thus as used herein, the first state corresponds to when the movable clamp device is operatively providing sufficient clamping forces to enable the pipeline to be moved without the pipeline slipping relative to the clamp device.

In example embodiments, the movable clamp device may include a plurality of hydraulic cylinders which are operative to cause movable portions 190 (e.g., pads) of the movable clamp device to move to rigidly clamp the pipeline. Hydraulic pumps and valves used to operate the hydraulic cylinder may be controlled by the described controller.

In addition, the described insertion device may include one or more drives 114 such as hydraulic motors. The controller may be operatively configured to cause the drives to move the movable clamp device between a first position 108 and a second position 110 on the frame. As explained in more detail below, in example embodiments the insertion device may include rack and pinion gear assemblies which enable the drive to move the movable clamp device along the frame. However, it is to be understood that alternative embodiments may employ other types of gears or other mechanical assemblies that are capable of moving the movable clamp device (and a pipeline clamped therein) with respect to the frame.

As illustrated in FIG. 1, the described system may be used to insert a pipeline in a bored out underground tunnel 130 or other pipeline application. Such a tunnel may be produced by a tunnel boring machine. As the tunnel is being produced or after the tunnel is produced, a plurality of pipeline housing segments 122 may be mounted inside the tunnel. Such housing segments may each include at least one bore 124 (i.e., a hollow passageway) therethrough. However, in a typical example, the segments may include three or more bores therethrough. Also, it should be understood that the term "bore" as used herein with respect to housing segments does not require that this bore be formed through a drilling process. Rather a bore is defined herein as a hollow passageway, which may be generated using any applicable process, including drilling and/or via forms, molds or other casting techniques as the housing segments are produced.

In example embodiments, the housing segments may correspond to pre-casted concrete segments that are transported into the tunnel and may be mounted serially in a manner such that the respective bores in each housing segment are axially aligned with the respective bores in each adjacent housing segment. In alternative embodiments the housing segments may be formed inside the tunnel by providing concrete into appropriate forms.

In addition, it should be appreciated that in some embodiments, the bores may include inner walls comprised of the concrete of which the housing segment is constructed. However, in alternative embodiments the walls of the bores of the housing segments may correspond to pipes made out of other materials (such as steel pipes) which are embedded in the concrete body of the housing segment.

Once the housing segments are mounted in the tunnel, the bores of the housing segments provide a straight passageway through which a straight run of pipeline may be inserted. Also, in an environment such as a tunnel, the described housing segments may correspond to floor segments. For example, the upper surfaces of the housing segments may be generally flat, and thus may correspond to a portion of roadway that is capable of accommodate movement of people and/or vehicles through the tunnel over the floor segments and pipelines contained therein. However, it is to be understood that in alternative embodiments the pipeline housing segments may not include an upper surface that can serve as a roadway for a vehicle.

As illustrated in FIG. 1, the described system may further include a plurality of support frames 116. Each support frame may include a channel 118 therethrough with at least one bearing 120 mounted therein for receiving portions of the pipeline in operatively sliding connection with the at least one bearing 120. The support frames may be respectively positioned in the tunnel between the bores of adjacent housing segments, such that the bores of the housing segments and the channels of the support frames are aligned to receive the pipeline extending in a substantially straight line therethrough. In this described embodiment, the bearings 120 of the support frames are positioned in a manner to fully or at least substantially support the run of the pipeline so as to prevent (or at least minimize) portions of the pipeline sliding against the inner surface of the bores of the housing segments.

As shown in FIG. 1, the housing segments may be produced (e.g., casted) to include a base 170 upon which the support frames may be mounted. Such bases 170 may be provided with a sufficient height relative to the bores 124 and such support frames may be constructed with appropriate dimensions, such that placement of the support frames on the bases may result in the channels 118 of the support frames being substantially aligned with the bores 124 of the segments (with minor positional adjustments).

In this regard, it should be understood that appropriate surveying equipment (e.g., lasers), shims, and other alignment tools and devices may be used to accurately place the channels of the support frames in the required amount of alignment with the bores of the housing segments to be within the tolerances needed for the particular pipeline application. Also, it should be appreciated that the housing segments may be appropriately surveyed and aligned to place their respective bores in axial alignment within the tunnel.

Also, it should be appreciated that the shapes of the bores and channels described herein may not be cylindrical. Thus as used herein, substantial alignment of the bores and channels corresponds to an alignment that is sufficient to provide at least one passageway through the described bores and channels, which passageway is capable of receiving a substantially straight cylindrical pipeline therethrough.

In example embodiments of the described system, the insertion device 102 is also positioned and aligned to properly direct portions of the pipeline into (and/or out of) the bores and channels of the housing segments and support frames. In an example embodiment, the insertion device may include alignment devices 172 that are operative to selectively horizontally and vertically raise/lower portions of the described frame to axially position and align openings through the movable clamp device 106 with the bores 124 of the housing segments 122 mounted in the tunnel 130.

Once the insertion device is properly positioned, pipeline segments may be mounted in the movable clamp device. The controller 126 may then be operated to cause the movable clamp device to change to the first state (which clamps the pipeline) and to cause the at least one drive to move the movable clamp device from the first position 108 to the second position 110 in order to begin the process of moving portions of the pipeline within the bores of housing segments and the channels of the support frames.

After the movable clamp device has moved to the second position, the controller is operative to cause the movable clamp device to change to the second state (which releases the pipeline) and to cause the at least one drive to move the movable clamp device from the second position back to the first position without moving (or at least without substantially moving) the pipeline relative to the housing segments and support frames.

As used herein, the process of pushing the pipeline forward via the movable clamp device moving from the first position to the second position (in a first direction), followed by moving the movable clamp device (but not the pipeline) back to the first position (in a second direction opposite the first direction), is referred to herein as an insertion cycle. After one or more insertion cycles, one or more additional pipeline segments 180 may be welded on to the end of the pipeline 112 and then the insertion devices may be operated again (for one or more insertion cycles) to move the lengthened pipeline further into the housing segments. The periodic operation of the insertion device and the welding on of additional pipeline segments may continue until the desired run of pipeline has been moved through the desired number of housing segments and support frames.

As can be appreciated, this described process may be carried out in the reverse direction to extract the pipeline from the housing segments. As used herein the process of pulling the pipeline outwardly via the movable clamp device moving (in first clamped state in the second direction) from the second position to the first position, followed by moving (in the first direction) the movable clamp device (but not the pipeline) in the (second released state) back to the second position, is referred to herein as an extraction cycle. After one or more extraction cycles, one or more pipeline segments 180 may be cut off the end of the pipeline 112 and then the insertion devices may be operated again (for one or more extraction cycles) to move the shortened pipeline further out of the housing segments. The periodic operation of the insertion device and the cutting off of pipeline segments may continue until the desired run of pipeline has been removed from the housing segments and support frames.

In an example embodiment, in order to prevent the pipeline from moving (when the movable clamp device is in the second released state and moves between the first and second positions) the insertion device may include a further stationary clamp device 150 to hold the pipeline in place while the movable clamp device returns to another position. The controller 126 may be operative to cause the stationary clamp device 150 to change to the first state (i.e., the clamped state) to rigidly hold the pipeline in place on the frame while the movable clamp device 106 is returned to its applicable starting position for another insertion (or extraction) cycle. Also, prior to the movable clamp device 106 moving the pipeline (either as an insertion or extraction cycle) the controller 126 is operative to cause the stationary clamp device 150 to change to the second state (i.e., the released state) to permit the pipeline to move relative to the stationary clamp device 150 as it is pushed (or pulled) by the movable clamp device.

Figure 2:
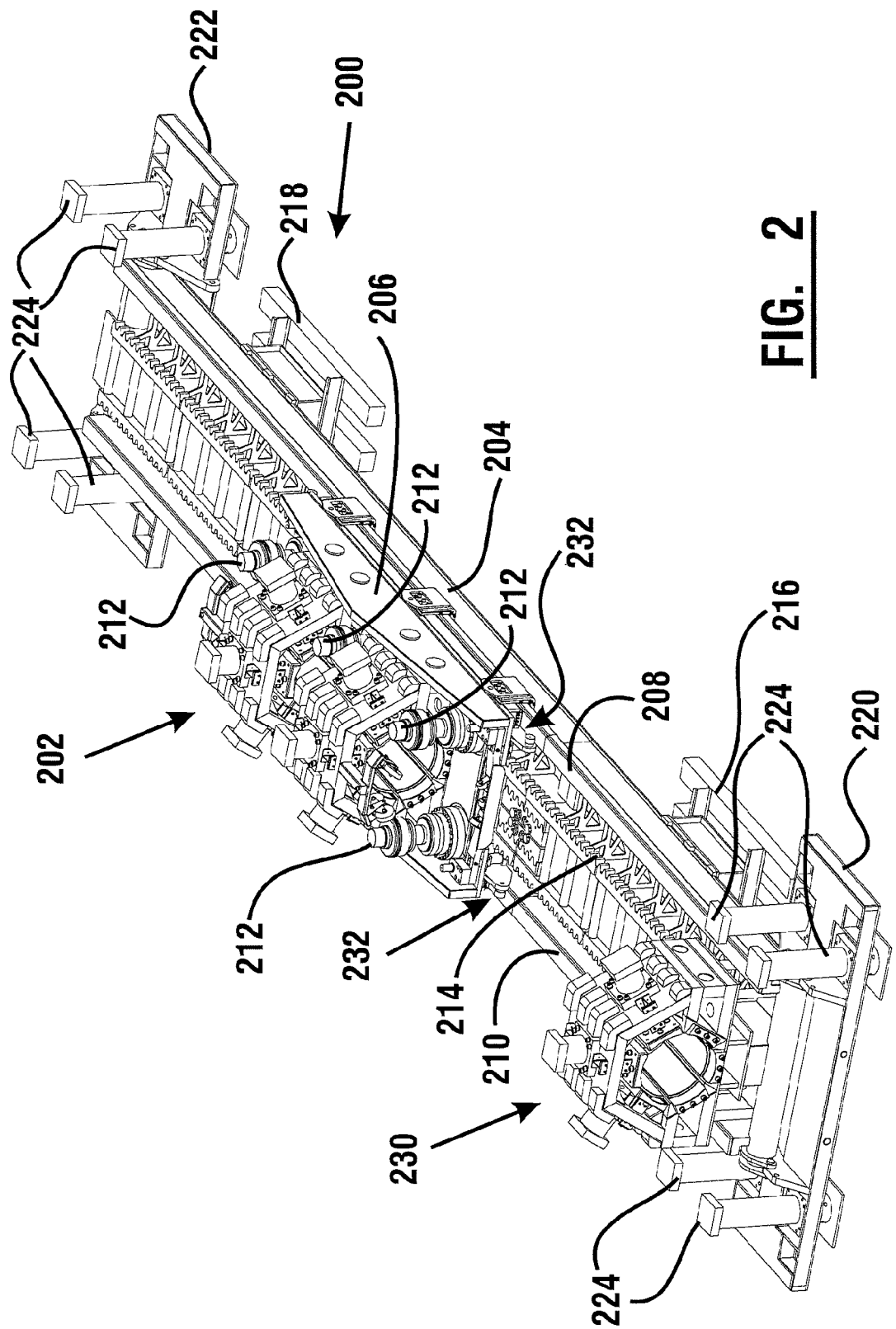
FIG. 2 is a perspective view of an example embodiment of an insertion device.

Referring now to FIG. 2, there is illustrated a perspective view of an example embodiment of an insertion device 200. FIG. 2 illustrates examples of the previously described hardware components that may be included in an insertion device. Such hardware may include a movable clamp device 202 which is mounted in slidable connection with an insertion device frame 204. Here the movable clamp device may include a carriage 206 that is in slidable engagement (e.g., via a plurality of rollers and/or bearings 232) with rails 208, 210 integrated into the frame 204 of the insertion device.

In order to move the movable clamp device 202 relative to the frame, the carriage 206 may include drives in the form of several motors 212 such as hydraulic motors. The hydraulic motors may be orientated to rotate respective pinion gears (312 shown in FIG. 3) adjacent a gear rack 214 mounted between the rails 208, 210. The previously described controller may be operative to control hydraulic pressure from a hydraulic pump to selectively cause the hydraulic motors to move the carriage 206 along the frame 204.

FIG. 2 also illustrates an example of a stationary clamp device 230 which is mounted in rigid engagement with the frame 204. In addition FIG. 2 illustrates examples of alignment devices that are usable to selectively position and align the inserter device. Here the alignment devices may include hydraulic dollies 216 and 218 to selectively move the insertion device laterally. Also, the alignment devices may include hydraulic jacks 220, 222 comprising vertically orientated hydraulic cylinders 224 to selectively move the insertion device vertically.

When initially positioning the insertion device 200 on a concrete pad or other foundation, the at least one controller may be operated to cause the dollies 216, 218 to move the insertion device laterally in order to horizontally align the openings of the movable clamp device and the bores of the housing segments. Subsequently, the at least one controller may be operated to selectively and individually cause the hydraulic cylinders 224 to raise or lower each side of each hydraulic jack 220, 222 of the insertion device to vertically align and orientate the openings in the movable clamp device 202 with the bores of the housing segments.

Figure 3:
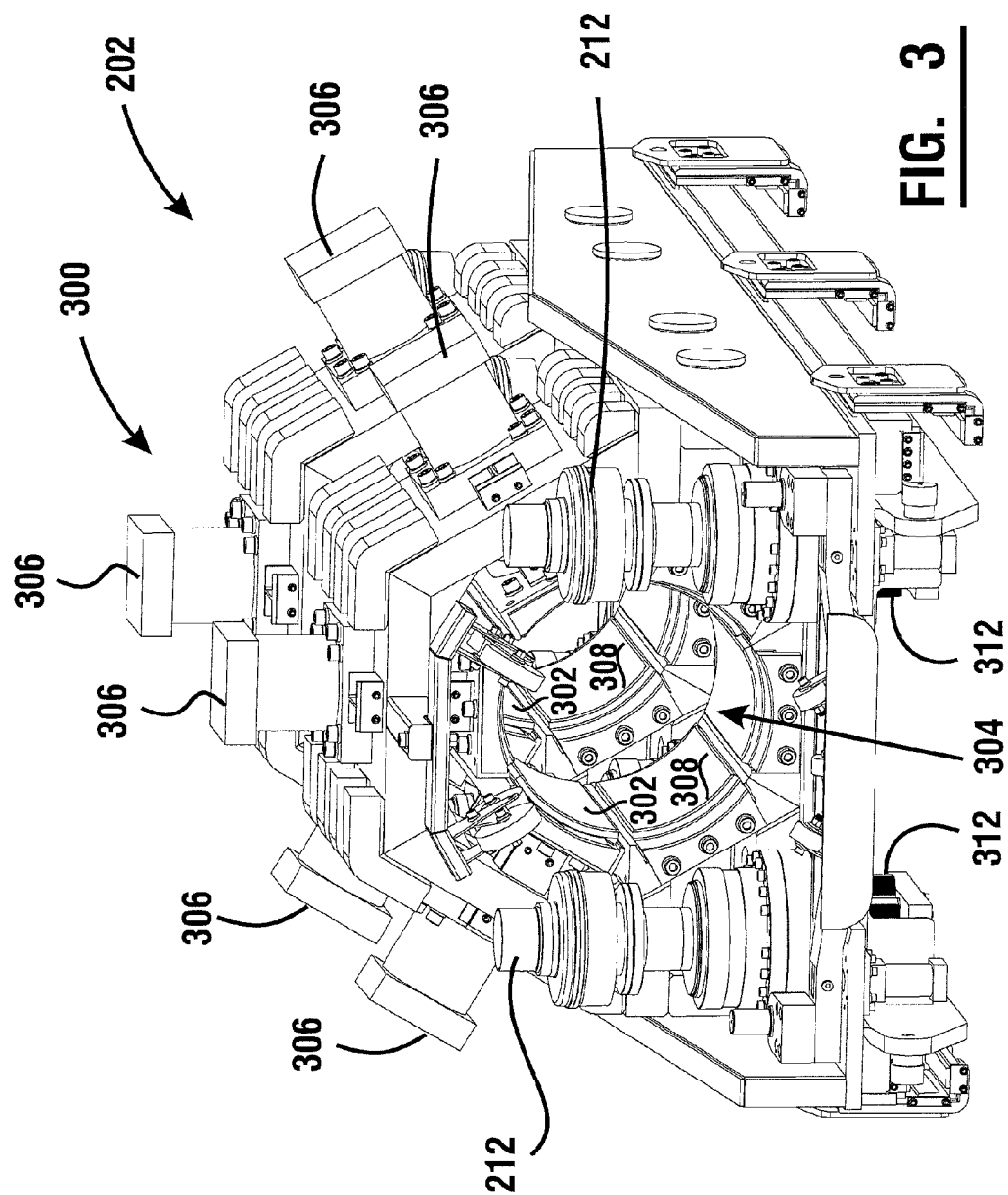
FIG. 3 is a perspective view of an example movable clamp device of the insertion device.

Referring now to FIG. 3, there is illustrated a perspective view 300 of the previously described movable clamp device 202. FIG. 3 shows the hydraulic motors 212 which are operative to rotate respective pinion gears 312 (along the gear rack 214 shown in FIG. 2).

Also, as shown in this example, the movable clamp device 202 may include a plurality of movable portions 302 that are positioned around at least a portion of the opening 304 in the movable clamp device that receives the pipeline. Such movable portions 302 may correspond to replaceable bonded friction shoes (also referred to herein as pads).

Also as illustrated in FIG. 3, the described movable portions 302 may generally be mounted to move inwardly to contact the top half (i.e., top 180 degrees) of the cylindrical surface of the pipeline. The bottom half of the pipeline (i.e., the bottom 180 degrees) may be supported by stationary portions 308 of the movable clamp device. Such stationary portions may also include replaceable bonded friction shoes/pads as well.

In this described embodiment, the movable portions 302 may be moved by respective hydraulic cylinders 306. Such hydraulic cylinders 306 may be selectively operated by the controller to control the amount of clamping forces applied to the pipeline by the movable portions 302. The hydraulic cylinders 306 may be operative to move each respective movable portion 302 radially inwardly towards a respective stationary portion 308 (on the opposite side of the pipeline) to clamp the pipeline in the previously described first state of the movable clamp device. The movable portions 302 may also be moved radially outwardly to the previously described second state of the movable clamp device to release the clamping forces acting on the pipeline. In addition, it should be appreciated that the movable clamp device may include multiple sets of respective movable/stationary portions, which sets are positioned to clamp different portions of the pipeline in a longitudinal direction.

Figure 4:
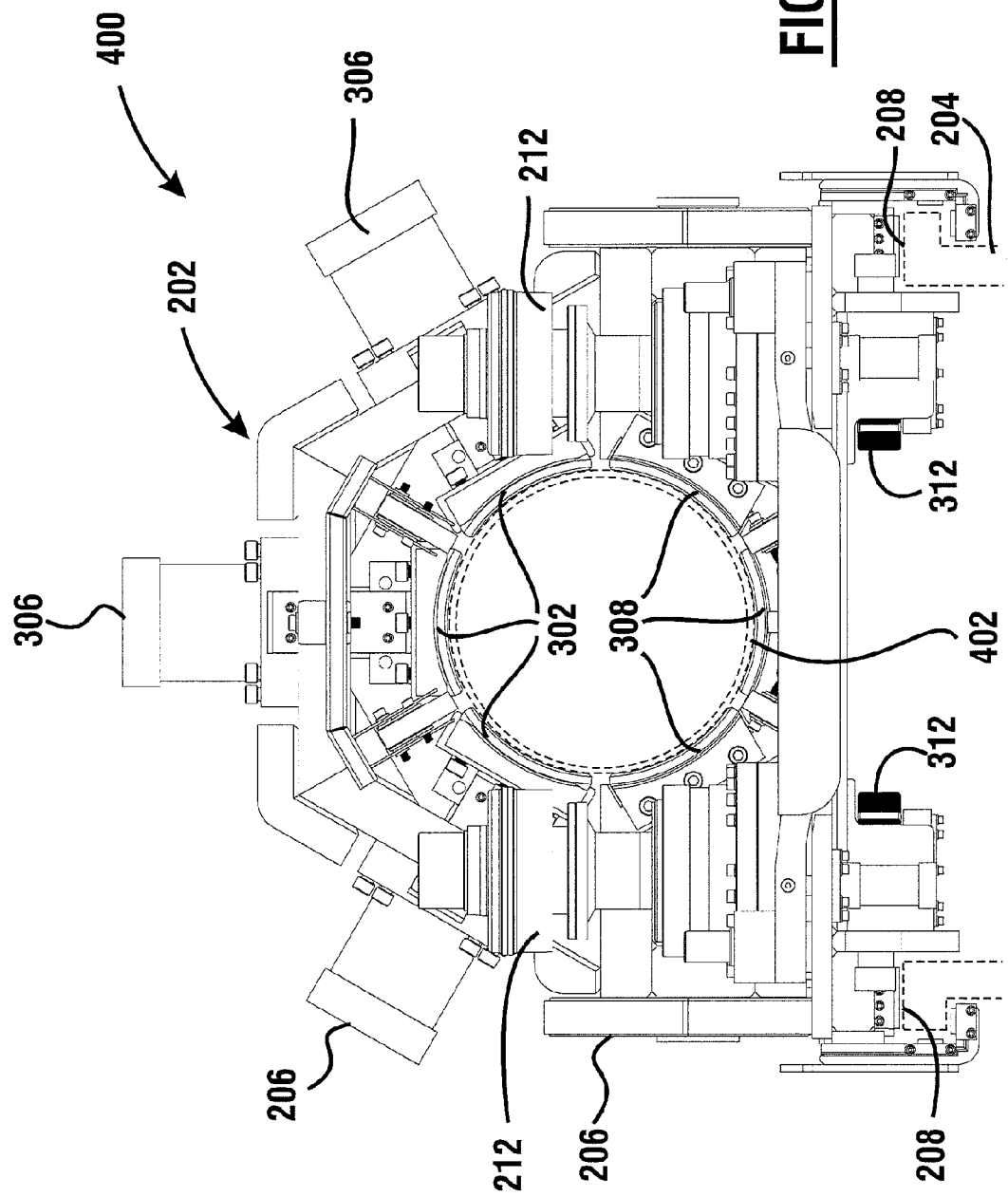
FIG. 4 is a front plan view of an example movable clamp device.

Referring now to FIG. 4, there is illustrated a front plan view 400 of the previously described movable clamp device 202 with a portion of the pipeline 402 clamped therein between the movable 302 and stationary 308 portions (e.g., shoes, pads). FIG. 4 also shows an example of the manner in which the carriage 206 of the movable clamp device may be mounted in slidable engagement with the frame 204 of the insertion device.

Figure 5:
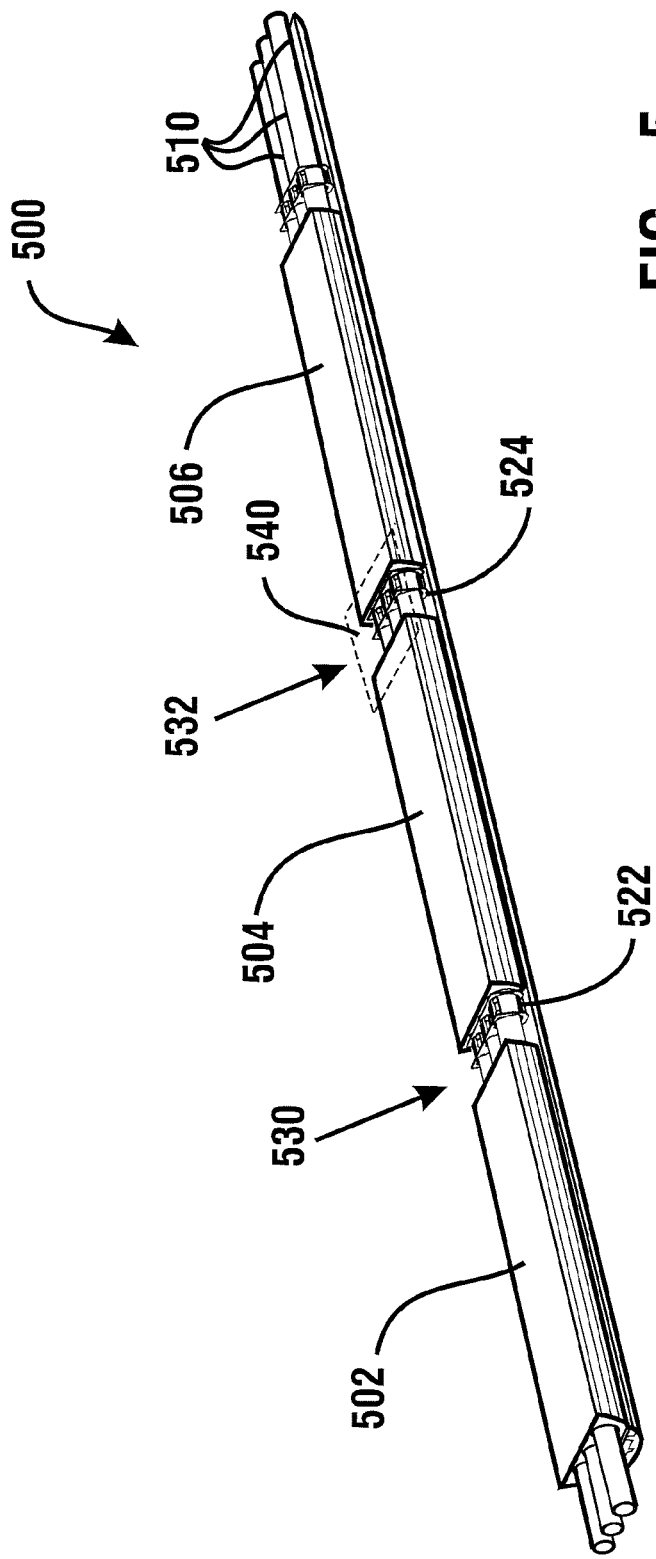
FIG. 5 is a perspective view of an example arrangement of housing segments and support frames.

As discussed previously, the described pipeline insertion system may include a plurality of housing segments that are mounted end to end in a tunnel. FIG. 5 illustrates an example arrangement 500 of housing segments 502, 504, 506 with three pipelines 510 inserted therethrough. FIG. 5 also shows examples of support frames 522, 524 mounted between ends of the housing segments. As shown in this view, the support frames may be located in gaps 530, 532 between the openings to the bores in adjacent housing segments. In order to enable the upper surface of the housing segments to serve as a roadway, steel plates or other planar elements 540 may be placed across these gaps to cover the support frames.

Figure 6:
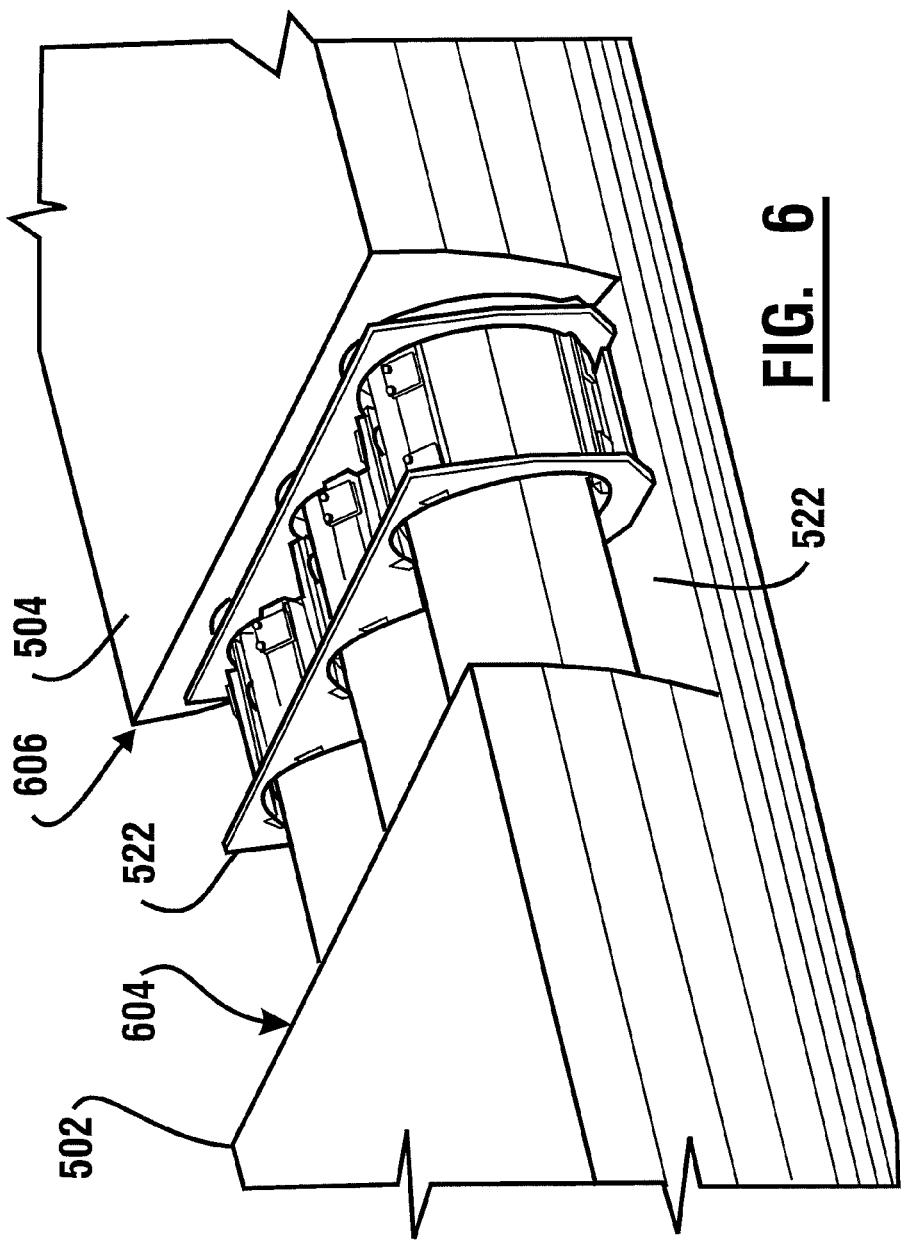
FIG. 6 is a perspective view of an example support frame mounted between ends of adjacent housing segments.

FIG. 6 shows a larger perspective view 600 of the support frame 522 that is positioned between opposite facing ends 604, 606 of adjacent housing segments 504, 502. As discussed previously, the housing segments may include a base 522 that is operative to serve as a foundation for the support frame 602. FIG. 6 also illustrates that a support frame may be constructed to support a plurality of pipelines (such as three or other number of pipelines) in side by side relation.

In example embodiments, the housing segments may correspond to separately poured units that are mounted in the tunnel in end to end relation. However, it is also to be understood that one or more housing segments may be formed integrally with each other as part of a common and continuous unit, rather than as separate components. In such cases, the term housing segment refers to each respective portion of the integral unit that includes one or more bores therethrough with respective bore ends that are exposed for mounting a support frame adjacent thereto. Also in this described embodiment, the bases 612 that serve as a foundation for the support frames may correspond to a portion of the continuous unit that integrally includes adjacent pairs of housing segments.

Figure 7:
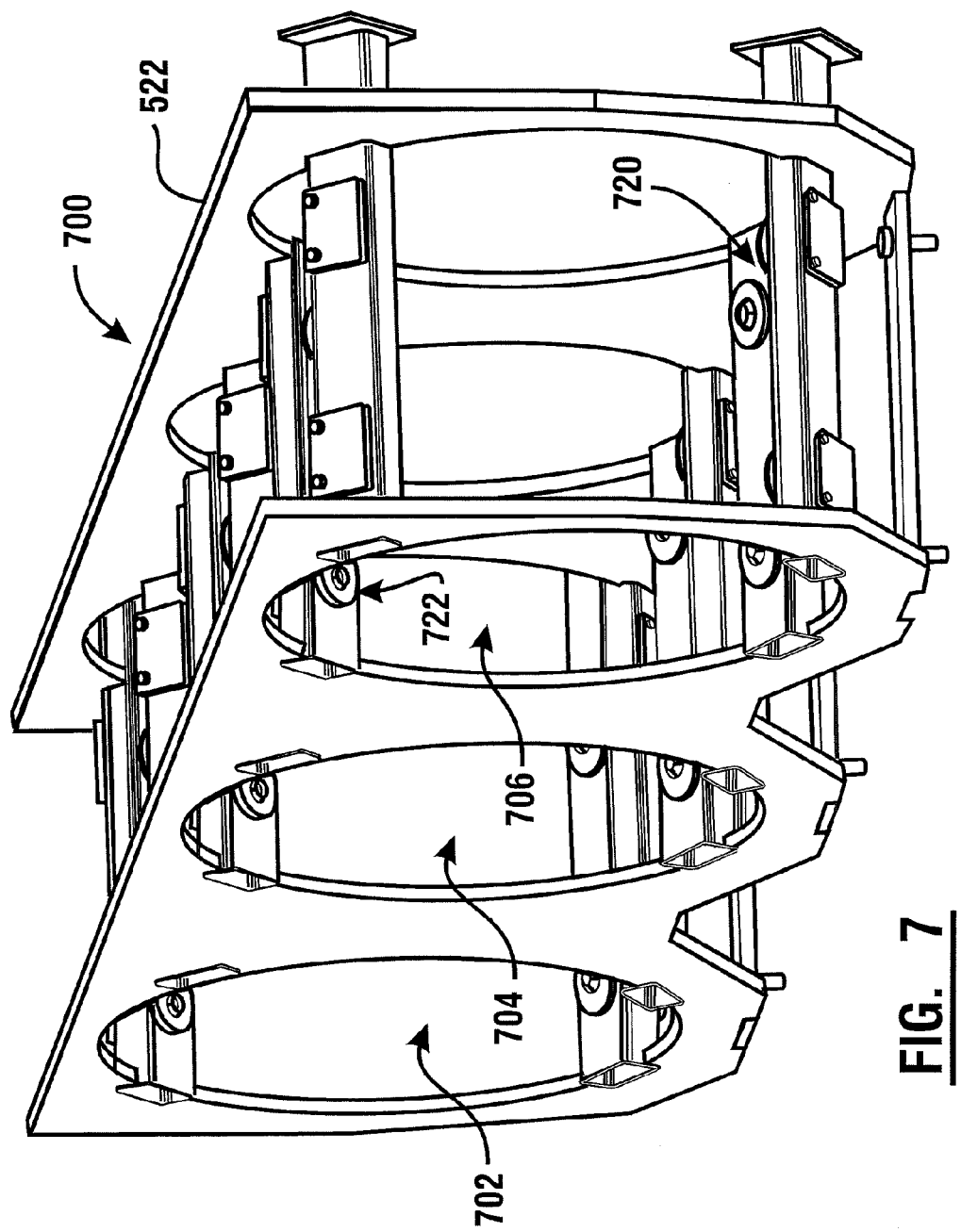
FIG. 7 is a perspective view of an example support frame without pipelines and housing segments.

Referring now to FIG. 7, there is illustrated a perspective view 700 of the support frame 522 without the pipeline and housing segments. Here the support frame is shown including three channels 702, 704, 706 through which pipelines may be inserted. In this example, each channel includes eight bearings, four bearings 720 of which are positioned to support the lower portion of the pipeline, and four bearings 722 of which are positioned to guide an upper portion of the pipeline.

In this described embodiment, the bearings 720, 722 mounted in each channel correspond to ball transfer type rollers. Such bearings may include a load-bearing spherical ball mounted inside a housing, which ball is supported by smaller ball bearings. However, it is to be understood that in alternative embodiments, other types and/or numbers of bearings may be used (e.g., contoured roller bearings) that are operative to support and/or guide the pipeline through the channel in the support frame.

Figure 8:
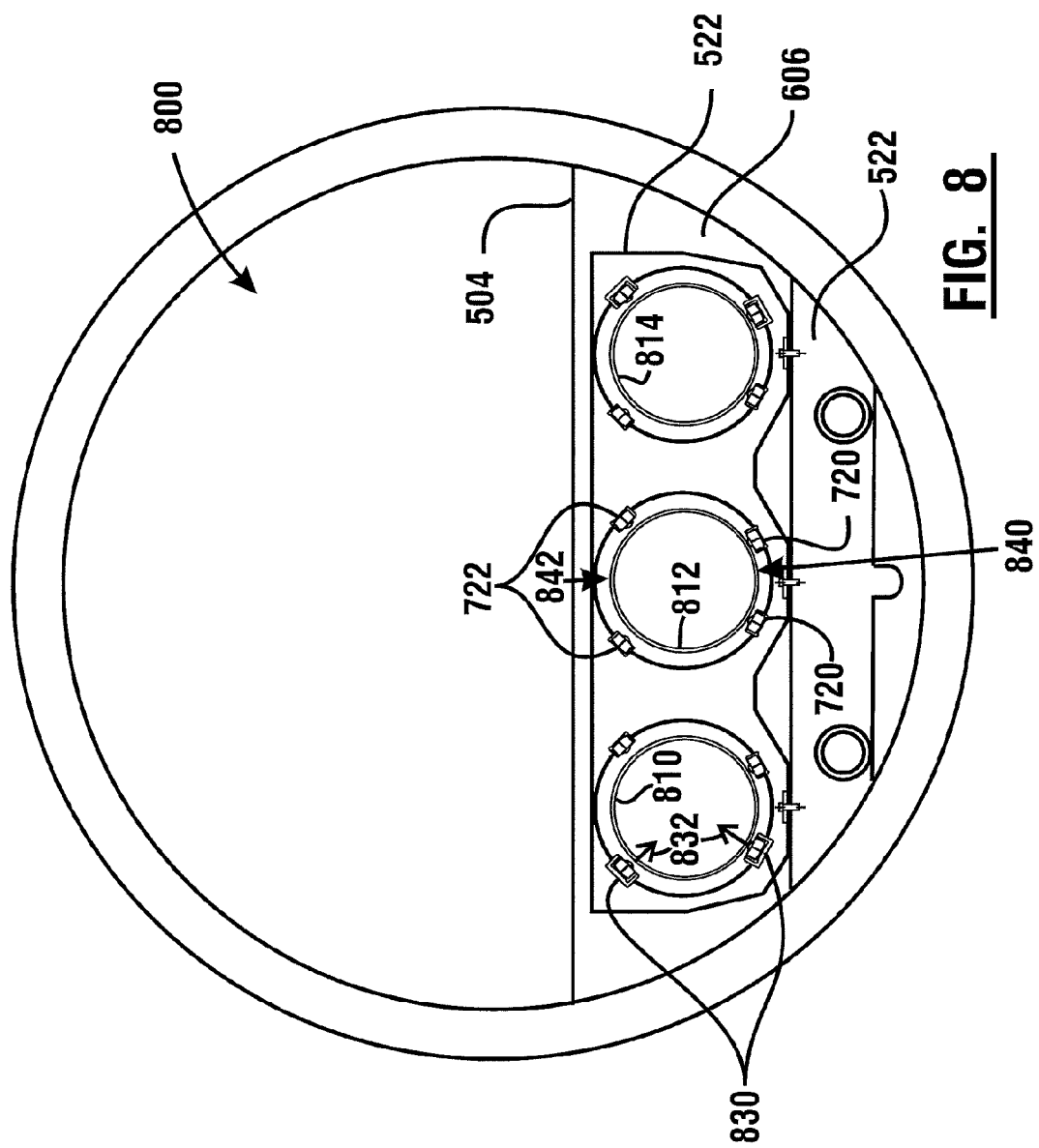
FIG. 8 is a front plan view of an example support frame mounted in a tunnel.

FIG. 8 illustrates a cross-sectional view of a tunnel 800 showing the manner in which the support frame 522 may be mounted on a housing segment base 522 adjacent an end 606 of the housing segment 504 through which three pipelines 810, 812, 814 extend therethrough and through respective bores of the support frame. As shown in FIG. 8, the bearings 830 in each channel may be mounted such that directions 832 normal to the most inwardly extending surfaces of their respective rolling elements (i.e., the top of the spherical ball) are orientated substantially radially with respect to the adjacent outer surfaces (and/or central longitudinal axis) of a pipeline 810, 812, 814 that is intended for use with the support frame. However, it should be appreciated that alternative embodiments with the same or different types of bearings may mount the bearings in different positions and/orientations.

In general, the frame supports are constructed to prevent the pipelines from contacting the inner surfaces of the bores of the housing segments. However, gravity and errors in aligning new pipeline segments may produce a pipeline which sags or bows upwardly a small amount to scrape portions of the inner walls of the bores of the housing segments. In example embodiments, the lower most portions 840 and the upper 842 most portions of the surfaces of the pipeline may experience the most wear in this regard, which results in non-smooth surfaces in these areas. To minimize the wear such non-smooth surfaces of the pipeline may impact on the bearings, the bearings may be mounted in locations of the support frame that are axially offset from these expected wear zones.

Thus as shown in FIG. 8, in an example embodiment, the lower bearings 720 in each channel may be mounted beneath portions of the lower half of the pipeline (to supportingly receive the pipeline) in locations that are offset from the lower most portion 840 of the outer surface of the pipeline. Similarly the upper bearings 722 in each channel may be mounted above portions of the upper half of the pipeline in locations that are offset from the upper most portion 842 of the outer surface of the pipeline. However, it is to be understood that in alternative embodiments, the bearings may be arranged in other locations around the interior of the channels based on the load support characteristics of the particular application of the pipeline insertion that is involved.

In addition, the lower bearings 720 and upper bearings 722 in each channel may be mounted at positions such that not all of the bearings in a channel are capable of contacting the surfaces of the pipeline at one time. Thus when the pipeline 812 is in contact with the lower bearings 720, a gap will be present between the upper bearings 722 and the surfaces of the pipeline. Similarly, if the pipeline includes a portion that bows upwardly in the channel of the support frame to contact the upper bearings 722, there will be a gap between the lower bearings and the surfaces of the pipeline.

In example systems, the amount of force required by the insertion device to push a pipeline through the bores of the housing segments will increase as the pipeline is lengthened. To minimize the rate of increase of the amount of force that is needed to push the pipeline, the lengths of the housing segments and thus the distances between support frames may become shorter in locations farther into the tunnel compared to locations closer to the insertion device. For example, the lengths of the housing segments near the entrance to the tunnel adjacent the insertion device may be on the order of ten meters, whereas the lengths of the housing segments four kilometers into the tunnel may be on the order of eight meters, and whereas the lengths of the housing segments eight kilometers into the tunnel may be on the order of six meters. Thus in this described arrangement, the farther the pipeline is pushed into the tunnel, there will be an increase in the number of bearings used to support a given length of the pipeline at the leading end of the pipeline (compared to the trailing end). Alternatively in another embodiment there may be an increase in the number bearings used to support a given length of pipeline at the trailing end of the pipeline compared to the leading end. Also in example embodiments the lengths of the housing segments may be substantially uniform for portions and/or all of the length of the desired pipeline.

In addition, to minimize the probability of the leading edge of the pipeline from becoming lodged against a support frame or housing segment due to sagging of the front of the pipeline, the leading end of the pipeline may include a rounded or tapered cap. Such a cap may assist in guiding the leading edge of the pipeline into the channel of a support frame or opening into a bore of a housing segment.

As discussed previously, the described example pipeline insertion system may include a plurality of different sensors on the insertion device. Sensors may also be mounted adjacent one or more of the support frames. The described controller may be operatively configured to use the information acquired by such sensors to adjust how the controller operates the insertion device and to provide an operator (or other party) with information on the operation of the system.

For example, each set of movable portions (e.g., shoes/pads) of the movable clamp device may be associated with a respective pressure sensor that is operative to measure the amount of pressure being placed on the adjacent surfaces of the pipeline by the respective movable portion. Such pressure sensors may correspond to transducers that are respectively mounted in the respective hydraulic circuits for each respective hydraulic cylinder that is used to move the shoes/pads adjacent the surface of the pipeline.

Also, the insertion device may include a movement sensor that is operative to detect relative movement (i.e., slippage) between the movable clamp device and the pipeline. In addition, the insertion device may include a thrust sensor that is operative to measure the amount of resistance force that is being experienced by the drives (e.g., hydraulic motors) when moving the pipeline with the movable clamp device. Such a thrust sensor may correspond to a transducer that is mounted in the hydraulic circuits for one or more of the described hydraulic motors that move the movable clamp device. In addition, it is to be understood that alternative embodiments may include other types of sensors (e.g., mechanical, optical, electronic) which carry out corresponding measurements of the pressures, forces, and movements described herein or any other operational characteristics of the system.

In an example embodiment, the controller may be operative responsive to the detection of slippage to cause the movable clamp device to provide more gripping force around the pipeline until the slippage of the pipeline ceases. Such additional gripping force may be achieved by causing the one or more of the hydraulic cylinders to direct more pressure acting on different portions of the surface of the pipeline. The controller may monitor the resulting pressure detected by the pressure sensor for each hydraulic cylinder so as to adjust each hydraulic cylinder in a manner that ensures that a uniform amount of pressure is being applied to the pipeline.

In addition, the controller may monitor the pressure sensors to determine that the amount of applied gripping force stays below a predetermined maximum threshold. The controller may also be operative to cause an output device to output an alarm signal or message responsive to the detection of slippage by the movement sensor and/or the detection by the thrust sensor of an amount force needed by the drives to move the pipeline which approaches (or surpasses) a predetermined maximum threshold.

Such an alarm signal may be indicative of the pipeline experiencing an intermittent increase in resistance to being pushed through the bores. To overcome such resistance, the controller may be operatively configured to be manually instructed via an input through an input device, to cause an amount of gripping force to be applied with the movable clamp device that exceeds the predetermined maximum threshold. In other cases, the controller may be operatively configured to be manually instructed via an input through the input device to cause the insertion device to operate to partially pull the pipeline in a reverse (outwardly) direction, and then begin again pushing the pipeline forward to attempt to move the pipeline passed the position that causes the increased amount of resistance.

Also in other cases to overcome such resistance, the controller may be operatively configured to adjust the speed of movement of the movable clamp device relative the inserter frame. For example, for some situations, the controller may cause the drives to move the movable clamp device faster to push the pipeline past a position that causes resistance. In other situations, the controller may cause the drives to move the movable clamp device slower until the thrust sensors detect that the resistance forces have decreased.

Example embodiments may also include other types of sensors or monitoring devices. For example sensors may be used that monitor the amount of wear on the shoes/pads of the movable and/or stationary clamp device. Also, example embodiments may include a plurality of video cameras positioned to monitor different operational aspects of the system. For example, the system may include a video camera that is positioned to monitor the insertion device, as well as video cameras operative to monitor one or more frame supports.

All or portions of the information collected from the video cameras, sensors, and the operational data associated with the controller and the described system may be provided through output devices locally near the system (e.g., in a operation cabin/trailer) or remote from the system (e.g., a workstation connected to the system via network such as the Internet). Also, such information may be collected in one or more data stores for use with analyzing the operational characteristics of the system.

As described previously, additional pipeline segments are welded on the end of the pipeline to lengthen the pipeline near the insertion device. In an example embodiment, such additional pipeline segment may be supported by movable supports having rollers and/or lifting mechanism that allow the new pipeline segment to be moved into proper alignment for welding. Such additional pipeline segments may also be tested prior to operating the insertion device to move the newly added pipeline segments into the bores of the housing segments.

Figure 9:
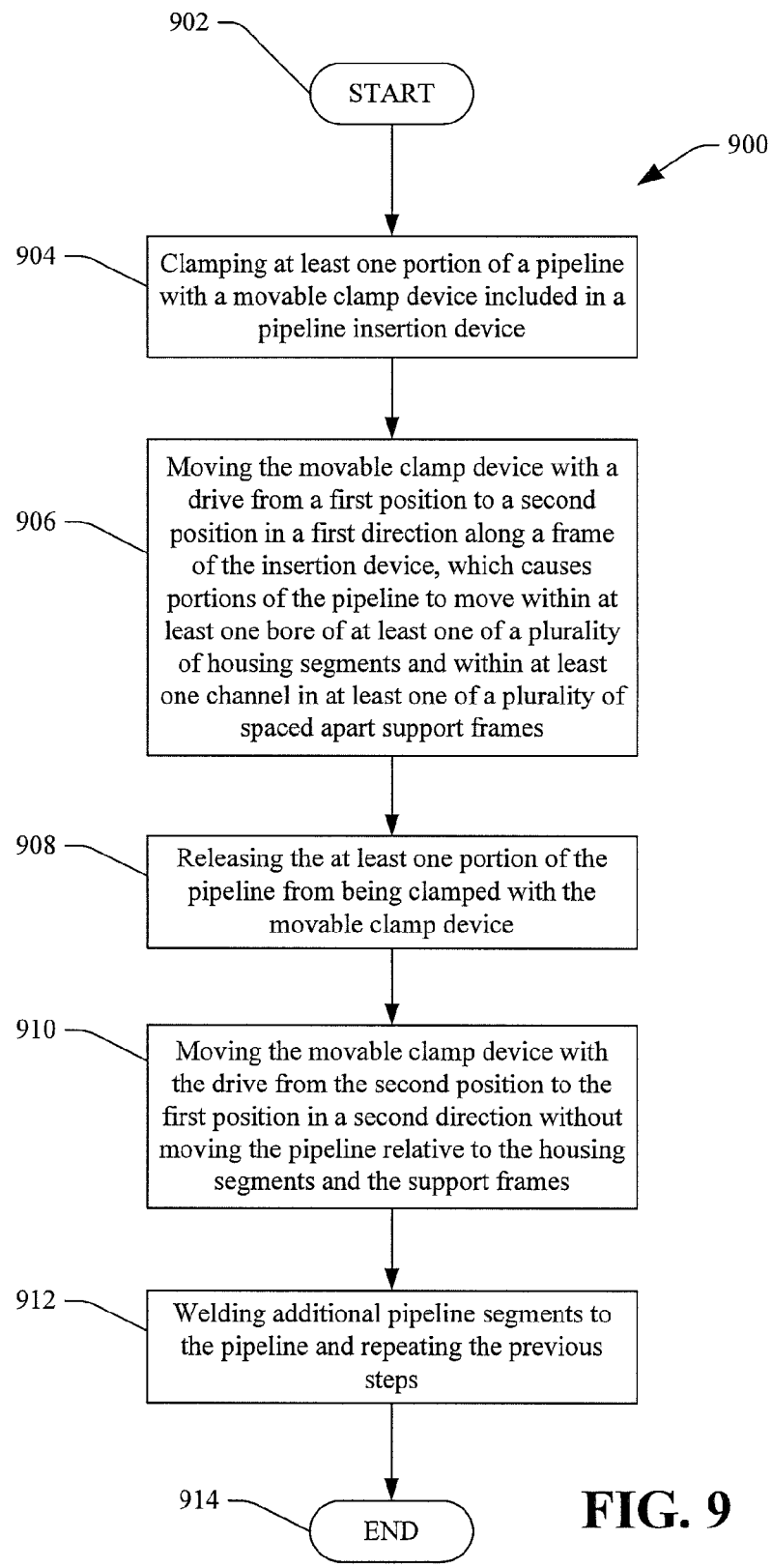
FIG. 9 is a flow diagram that illustrates an example methodology for operating a pipeline insertion device to insert a pipeline.

With reference now to FIG. 9, an example methodology is illustrated and described associated with the operation of the previously described example pipeline insertion system to insert a pipeline into the bores of housing segments within a tunnel. While the methodology is described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, some of the acts described herein may be caused by computer-executable instructions that can be implemented by one or more processors and/or stored on a non-transitory computer-readable medium or media. The computer-executable instructions may include a routine, a sub-routine, programs, a thread of execution, and/or the like. Still further, results of acts of the example methodologies may be stored in a computer-readable medium, displayed on a display device, and/or the like.

As illustrated in FIG. 9, the methodology 900 begins at 902, and at 904 includes a step of clamping at least one portion of a pipeline with a movable clamp device included in a pipeline insertion device. At step 906, the method includes moving the movable clamp device with the at least one drive from a first position to a second position in a first direction along the frame, which causes portions of the pipeline to move within bores in a plurality of housing segments and within channels in a plurality of spaced apart support frames.

Continuing at step 908, the methodology may include a step of releasing the at least one portion of the pipeline from being clamped with the movable clamp device. Also at step 910, the methodology may include a step of moving the movable clamp device with the drive from the second position to the first position in a second direction that is opposite the first direction without moving the pipeline relative to the housing segments and the support frames. In an example embodiment, a further stationary clamp device may be operative to clamp the pipeline and prevent the pipeline from moving while the movable clamp device returns to the first position.

Steps 904 to 910 correspond to an insertion cycle. After one or more repeated insertion cycles the methodology may include a step 912 of welding at least one pipeline segment to the pipeline on an end of the pipeline that is outside the bores of the housing segments. After the pipeline is lengthened in this manner, the described methodology may be repeated a sufficient number of times to insert an increasingly longer pipeline into the housing segments for the distance that is required for the application. At 914 the described methodology may end.

As discussed previously, the housing segments and support frames may include more than one bore and channel therethrough for use with inserting additional pipeline. In such cases, the described methodology 900 may include repositioning the insertion device with the described hydraulic dollies and jacks so as to align the insertion device with another bore hole. The previously described methodology 900 may then be carried out to insert a further pipeline into the other bore holes in the housing segments.

Figure 10:
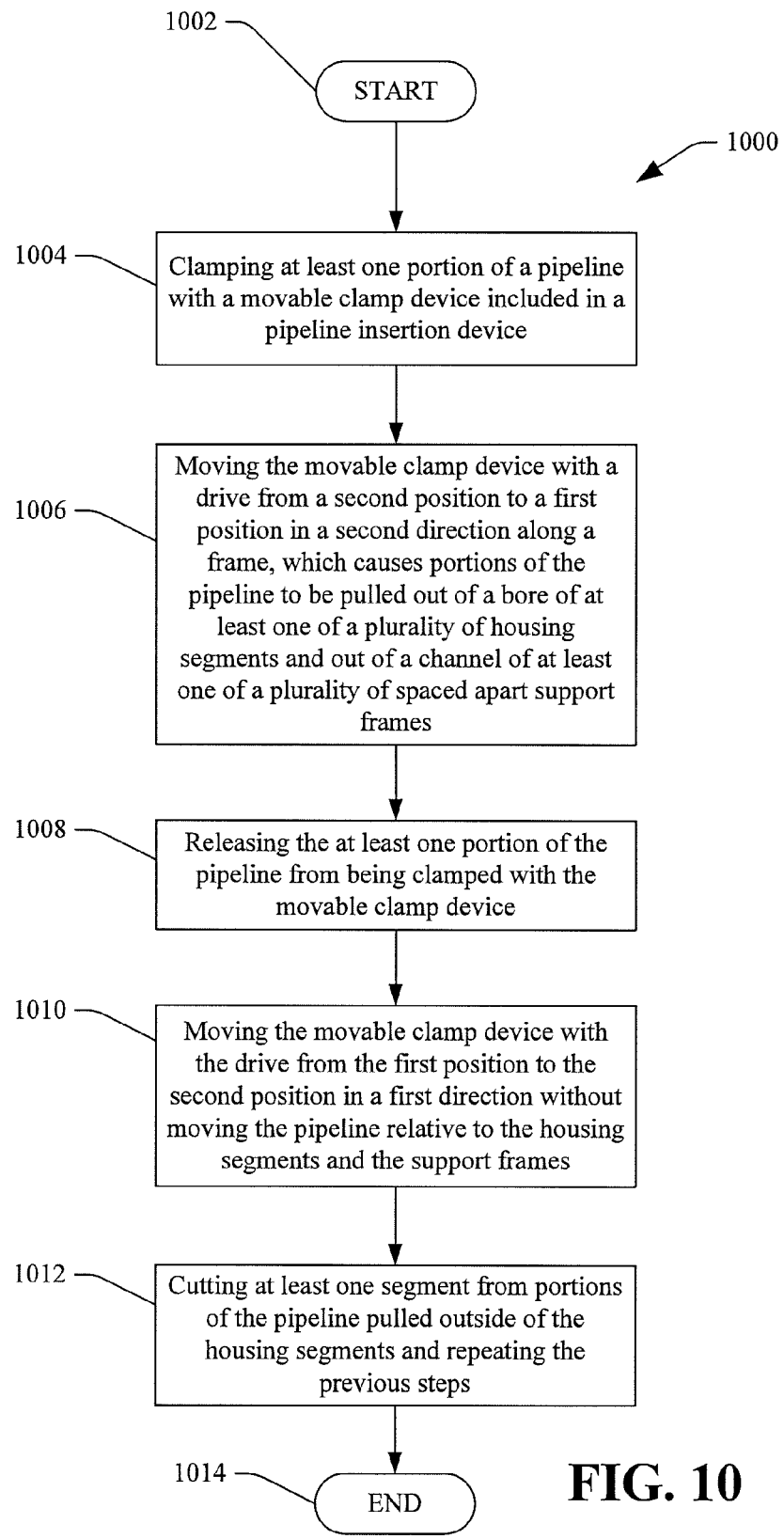
FIG. 10 is a flow diagram that illustrates an example methodology for operating a pipeline insertion device to extract a pipeline.

With reference now to FIG. 10, an example methodology is illustrated and described associated with the operation of the previously described example pipeline insertion system to extract a pipeline from the bores of housing segments within a tunnel. This methodology 1000 begins at 1002, and at 1004 includes a step of clamping at least one portion of a pipeline with a movable clamp device included in a pipeline insertion device. At step 1006, the method includes moving the movable clamp device with a drive from a second position to a first position in a second direction along a frame, which causes portions of the pipeline to be pulled out of a bore of at least one of a plurality of housing segments and out of a channel of at least one of a plurality of spaced apart support frames.

Continuing at step 1008, the methodology may include a step of releasing the at least one portion of the pipeline from being clamped with the movable clamp device. Also at step 1010, the methodology may include a step of moving the movable clamp device with the drive from the first position to the second position in a first direction without moving the pipeline relative to the housing segments and the support frames. In an example embodiment, a stationary clamp device may be operative to clamp the pipeline and prevent the pipeline from moving while the movable clamp device returns to the first position.

Steps 1004 to 1010 correspond to an extraction cycle. After one or more repeated extraction cycles, the methodology may include a step 1012 of cutting at least one pipeline segment from the pipeline on an end of the pipeline that has been pulled outside the bores of the housing segments. After the pipeline is shortened in this manner, the described methodology may be repeated a sufficient number of times to extract a decreasingly shorter pipeline from the housing segments for the distance that is required for the application. At 1014 the described methodology may end.

In embodiments in which the housing segments and support frames include more than one bore and channel therethrough, the described methodology 1000 may include repositioning the insertion device with the described hydraulic dollies and jacks so as to align the insertion device with another bore hole. The previously described methodology 1000 may then be carried out to extract a further pipeline from the other bore holes in the housing segments.

Methodologies 900 and 1000 have been described with respect to a process of inserting or extracting pipelines through bores in housing segments mounted in a bored out tunnel. However, it is to be understood that all or portions of the described methodologies and insertion systems may be adapted for use in other environments such as in wetlands and shoreline approaches for pipelines. In such cases the insertion device may be used to insert or extract a pipeline from the bore holes of other types of pipeline housing segments that may not correspond to floor segments having an upper surface usable as a roadway. It is to be understood that the element of a housing segment may include other types of structures having one or more bores therein and that can accommodate the placement of the previously described support frames on opposite ends of the bores that extend through housing segments.

As used herein, the described at least one processor 112 may be included in a computing device (such as a computer or a dedicated controller) that executes instructions that are stored in a memory as software or firmware. The instructions may be, for instance, instructions for causing devices of the described system to operate or instructions for implementing one or more of the methods described above. The processor may access the memory by way of a system bus or other type of memory controller/bus.

Additionally, while illustrated as a single system, it is to be understood that the computing device may be a distributed system. Thus, for instance, the processor and several devices may be in communication by way of a network connection and may collectively perform tasks described as being performed by the described systems.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A pipeline insertion system comprising:
at least one controller,
an insertion device operative to receive a portion of a pipeline, wherein the insertion device includes:
an insertion device frame;
a movable clamp device in slidable engagement with the insertion device frame, wherein the at least one controller is operatively configured to cause the movable clamp device to change between a first state and a second state, wherein in the first state the movable clamp device is operative to clamp at least one portion of the pipeline and prevent relative movement between the movable clamp device and the pipeline, wherein in the second state the movable clamp device is operative to release the at least one portion of the pipeline and permit relative movement between the movable clamp device and the pipeline;
at least one drive, wherein the at least one controller is operatively configured to cause the at least one drive to move the movable clamp device between a first position and a second position along the insertion device frame;
a plurality of housing segments, wherein each housing segment includes at least one bore therethrough for receiving portions of the pipeline;
a plurality of support frames, wherein each support frame includes a channel therethrough with at least one bearing mounted therein for receiving portions of the pipeline in operatively sliding connection with the at least one bearing, wherein the support frames are respectively positioned between the bores of adjacent housing segments, such that the bores of the housing segments and the channels of the support frames are aligned to receive the pipeline extending in a substantially straight line therethrough; and
wherein the at least one controller is operatively configured to cause the movable clamp device to change to the first state and to cause the at least one drive to move the movable clamp device from the first position to the second position in order to move portions of the pipeline within the housing segments and support frames, wherein the at least one controller is operatively configured to cause the movable clamp device to change to the second state and to cause the at least one drive to move the movable clamp device from the second position to the first position without moving the pipeline relative to the housing segments and support frames.

2. The pipeline insertion system according to claim 1, wherein each support frame includes a plurality of ball transfer type roller bearings mounted in the channel of each support frame, wherein at least two of the plurality of ball transfer type roller bearings for each support frame are positioned in the respective channel of the support frame to supportingly receive portions of a bottom portion of the pipeline extending in the channel of the support frame, wherein at least two of the plurality of ball transfer type roller bearings for each support frame are positioned in the respective channel of the support frame to face a top portion of the pipeline extending in the channel of the support frame.

3. The pipeline insertion system according to claim 1, wherein farther housing segments positioned relatively farther from the insertion device than closer housing segments positioned relatively closer to the insertion device, include a relatively shorter maximum length than the closer housing segments.

4. The pipeline insertion system according to claim 1, wherein the housing segments include substantially flat upper surfaces that form at least portions of a roadway in the tunnel.

5. The pipeline insertion system according to claim 4, wherein at least one housing segment that is between two support frames has a bore extending between the at least two support frames that is at least 10 meters long, wherein each housing segment is comprised of concrete.

6. The pipeline insertion system according to claim 1, wherein the insertion device frame includes at least one gear rack, wherein the movable clamp device includes at least one pinion gear in operative engagement with the gear rack, wherein the at least one drive corresponds to a hydraulic motor that is operative to cause the at least one pinion gear to rotate to cause the movable clamp device to move relative the frame between the first and second positions.

7. The pipeline insertion system according to claim 6, wherein the insertion device frame includes at least one rail, wherein the movable clamp device includes a carriage that is operative to slide relative the at least one rail between the first and second positions.

8. The pipeline insertion system according to claim 1, wherein the insertion device frame includes at least one stationary clamp device, wherein the movable clamp device is operative to move relative both the insertion device frame and the stationary clamp device;
  wherein the stationary clamp device is operative to receive at least a portion of the pipeline therein, wherein the at least one controller is operatively configured to cause the stationary clamp device to change between a first state and a second state, wherein in the first state, the stationary clamp device is operative to clamp at least one further portion of the pipeline and prevent relative movement between the stationary clamp device and the pipeline, wherein in the second state the stationary clamp device is operative to release the at least one further portion of the pipeline and permit relative movement between the stationary clamp device and the pipeline;
  wherein the at least one controller is operatively configured:
    to cause the stationary clamp device to change to the first state;
    to cause the movable clamp device to change to the second state; and
    to cause the at least one drive to move the movable clamp device between the first and second positions while the stationary clamp device prevents the pipeline from moving relative to the insertion device frame;
  wherein the at least one controller is operatively configured:
    to cause the stationary clamp device to change to the second state;
    to cause the movable clamp device to change to the first state; and
    to cause the at least one drive to move the movable clamp device between the first and second positions while the stationary clamp device permits the pipeline to move relative to the insertion device frame.

9. The pipeline insertion system according to claim 1, wherein the movable clamp device includes at least one stationary portion and at least one movable portion, wherein the at least one controller is operatively configured to cause the at least one movable portion to move between a first position and a second position relative to the at least one stationary portion, wherein the at least one movable portion in the first position rigidly clamps the pipeline between the at least one stationary portion and the at least one movable portion, wherein the at least one movable portion in the second position is relatively farther from the at least one stationary portion than when the at least one movable portion is in the first position, wherein the first state of the movable clamp device includes the at least one movable portion in the first position, wherein the second state of the movable clamp device includes the at least one movable portion in the second position.

10. The pipeline insertion system according to claim 9, wherein the movable clamp device includes at least three movable portions positioned to move in three different respective radial directions with respect to a longitudinal axis of the pipeline, wherein the movable portions include pads that are operative to contact the outer surface of the pipeline, wherein the movable clamp device includes hydraulic cylinders which are operative to selectively move the pads of the movable portions between the first and second states.

11. The pipeline insertion system according to claim 9, further comprising:
  at least one first sensor operatively configured to be used by the at least one controller to determine if the pipeline moves relative to the movable clamp device when the at least one controller causes the at least one drive to move the movable clamp device relative to the insertion device frame,
  wherein the at least one controller is operatively configured to cause the at least one movable portion of the movable clamp device to provide an increased amount of force to be applied to the pipeline by the movable portion responsive to the at least one first sensor detecting relative movement between the movable clamp device and the pipeline.

12. The pipeline insertion system according to claim 11, further comprising:
  at least one second sensor operatively configured to monitor an amount of pressure applied to the pipeline by the at least one movable portion of the movable clamp device,
  wherein the at least one controller is operatively configured to prevent the at least one movable portion of the movable clamp device from providing an amount of pressure on the pipeline that exceeds a predetermined threshold responsive to the at least one second sensor.

13. The pipeline insertion system according to claim 1, further comprising:
  at least one first sensor operatively configured to monitor an amount of force applied to the pipeline in at least one direction by the movable clamp device when being caused to move by the at least one drive,
  wherein the at least one controller is operatively configured to cause the at least one drive to adjust the speed of movement of the movable clamp device relative to the frame responsive to the at least one first sensor.

14. A method of moving a pipeline comprising:
  a) clamping at least one portion of a pipeline with a movable clamp device included in a pipeline insertion device, wherein the pipeline insertion device includes an insertion device frame, the movable clamp device in slidable engagement with the insertion device frame, and at least one drive, wherein the movable clamp device is operative to move between a first position and a second position along the insertion device frame, wherein the movable clamp device is operatively configured to change between a first state and a second state, wherein in the first state the movable clamp device is operative to clamp the at least one portion of the pipeline and prevent relative movement between the movable clamp device and the pipeline in at least one direction, wherein in the second state the movable clamp device is operative to release the at least one portion of the pipeline and permit relative movement between the movable clamp device and the pipeline; and b) moving the movable clamp device with the at least one drive from the first position to the second position in a first direction along the insertion device frame, which causes portions of the pipeline to move within at least one bore in at last one of a plurality of housing segments and within at least one channel in at least one of a plurality of spaced apart support frames, wherein each channel of each support frame includes at least one bearing mounted therein for receiving portions of the pipeline in operatively sliding connection with the at least one bearing, wherein the support frames are respectively positioned between the bores of adjacent housing segments, such that the bores of the housing segments and the channels of the support frames are aligned to receive the pipeline extending in a substantially straight line therethrough.

15. The method according to claim 14, further comprising:
c) releasing the at least one portion of the pipeline from being clamped with the movable clamp device;
d) moving the movable clamp device with the at least one drive from the second position to the first position in a second direction that is opposite the first direction without moving the pipeline relative to the housing segments and the support frames.

16. The method according to claim 15, wherein at least one controller is operatively configured to cause the movable clamp device and the at least one drive to carry out steps (a) through (d).

17. The method according to claim 16, further comprising:
e) prior to (a), welding at least one pipeline segment to the pipeline while the pipeline is in operatively supported connection with the insertion device and while the pipeline extends through at least one housing segment and at least one support frame,
wherein in (b), when the movable clamp device moves from the first position to the second position, portions of the pipeline segment move to a location which is capable of being directly engaged by the movable clamp device after the movable clamp device returns to the first position in (d).

18. The method according to claim 17, further comprising carrying out steps (a) through (e) a sufficient number of times including welding a sufficient number of further pipeline segments to the pipeline in (e) to cause the at least one pipeline segment to move through a plurality of housing segments and a plurality of support frames a distance of at least one kilometer in a substantially straight line.

19. The method according to claim 15, wherein the frame includes at least one stationary clamp device, wherein the movable clamp device is operative to move relative to both the frame and the stationary clamp device, wherein the stationary clamp device is operative to receive at least a portion of the pipeline therein, wherein the stationary clamp device is operatively configured to change between a first state and a second state, wherein in the first state, the stationary clamp device is in rigid engagement with the pipeline, which rigid engagement prevents relative movement between the stationary clamp device and the pipeline in the at least one direction, wherein in the second state the stationary clamp device is operative to permit relative movement between the stationary clamp device and the pipeline in the at least one direction, further comprising:

e) prior to (a) operating the stationary clamp device to change to the second state, wherein in (a) the movable clamp device changes to the first state, wherein in (b) the movable clamp device moves from the first position to the second position in the first direction while the stationary clamp device permits the pipeline to move relative to the insertion device frame;
f) prior to (d) operating the stationary clamp device to change to the first state to rigidly engage at least one portion of the pipeline, wherein in (c) the movable clamp device changes to the second state, wherein in (d) the movable clamp device moves from the second position to the first position in the second direction while the stationary clamp device prevents the pipeline from moving relative to the insertion device frame.

20. A method of moving a pipeline comprising:
a) clamping at least one portion of a pipeline with a movable clamp device included in a pipeline insertion device, wherein the pipeline is at least one kilometer in length, wherein the pipeline insertion device includes an insertion device frame, the movable clamp device in slidable engagement with the insertion device frame, and at least one drive, wherein the movable clamp device is operative to move between a first position and a second position along the insertion device frame, wherein the movable clamp device is operatively configured to change between a first state and a second state, wherein in the first state the movable clamp device is operative to clamp the at least one portion of the pipeline and prevent relative movement between the movable clamp device and the pipeline in at least one direction, wherein in the second state the movable clamp device is operative to release the at least one portion of the pipeline and permit relative movement between the movable clamp device and the pipeline; and
b) moving the movable clamp device with the at least one drive from the first position to the second position in a first direction along the insertion device frame, which causes portions of the pipeline to move within channels in a plurality of spaced apart support frames positioned in a tunnel, wherein each channel of each support frame includes at least one roller operative to contact the pipeline as the pipeline moves through the channel, wherein the support frames are positioned in the tunnel in spaced apart relation spanning a distance of at least one kilometer, wherein the channels of the support frames are aligned to receive the moving pipeline extending in a substantially straight line therethrough for at least one kilometer.

21. The method according to claim 20, wherein (b) includes causing portions of the pipeline to move within bores in a plurality of housing segments and within the channels of the plurality of spaced apart support frames, which positions of the housing segments and support frames span a distance of at least one kilometer, wherein the support frames are respectively positioned between the bores of adjacent housing segments, such that the bores of the housing segments and the channels of the support frames are aligned to receive the pipeline extending in a substantially straight line therethrough for at least one kilometer.

* * * * *